United States Patent
Deng et al.

(10) Patent No.: US 11,080,492 B2
(45) Date of Patent: Aug. 3, 2021

(54) METHOD AND DEVICE FOR CORRECTING ERROR IN TEXT

(71) Applicant: Beijing Baidu Netcom Science and Technology Co., Ltd., Beijing (CN)

(72) Inventors: Zhuobin Deng, Beijing (CN); Liqun Zheng, Beijing (CN); Xiyi Luo, Beijing (CN); Zhihong Fu, Beijing (CN); Jingzhou He, Beijing (CN)

(73) Assignee: Beijing Baidu Netcom Science and Technology Co., Ltd., Beijing (CN)

( * ) Notice: Subject to any disclaimer, the term of this patent is extended or adjusted under 35 U.S.C. 154(b) by 126 days.

(21) Appl. No.: 16/692,549

(22) Filed: Nov. 22, 2019

(65) Prior Publication Data
US 2020/0192983 A1 Jun. 18, 2020

(30) Foreign Application Priority Data
Dec. 17, 2018 (CN) .......................... 201811543962.6

(51) Int. Cl.
*G06F 40/30* (2020.01)
*G06F 40/289* (2020.01)
(Continued)

(52) U.S. Cl.
CPC ............ *G06F 40/30* (2020.01); *G06F 40/289* (2020.01); *G06N 3/04* (2013.01); *G06N 3/08* (2013.01)

(58) Field of Classification Search
CPC ... G06F 17/2785; G06F 17/2775; G06N 3/08; G06N 3/04
See application file for complete search history.

(56) References Cited

U.S. PATENT DOCUMENTS

| 10,726,830 | B1* | 7/2020 | Mandal | ................... G10L 15/16 |
| 2015/0100524 | A1* | 4/2015 | Pantel | ............... G06F 16/24578 |
| | | | | 706/12 |

(Continued)

FOREIGN PATENT DOCUMENTS

| CN | 106708893 A | 5/2017 |
| CN | 106815193 A | 6/2017 |

(Continued)

OTHER PUBLICATIONS

Notification of the First Office Action dated Mar. 31, 2020 issued in connection with Chinese Application No. 2018115439626.

(Continued)

*Primary Examiner* — Kevin Ky
(74) *Attorney, Agent, or Firm* — Akerman LLP

(57) ABSTRACT

A method and device for correcting an error in a text are provided. The method includes: preprocessing the text to obtain at least one segment of the text; generating a plurality of candidate segments for the segment; scoring the plurality of candidate segments with a tree model, to obtain respective first scoring results of the plurality of candidate segments; scoring the plurality of candidate segments with a deep neural network model, to obtain respective second scoring results of the plurality of candidate segments; for each candidate segment, calculating a scoring of the candidate segment based on the first scoring result and the second scoring result of the candidate segment; ranking the plurality of candidate segments according to the scorings of the candidate segments, to obtain a ranking result; and correcting the error in the text according to the ranking result.

11 Claims, 5 Drawing Sheets

(51) Int. Cl.
*G06N 3/04* (2006.01)
*G06N 3/08* (2006.01)

(56) References Cited

U.S. PATENT DOCUMENTS

| | | |
|---|---|---|
| 2017/0308798 A1 | 10/2017 | Grom et al. |
| 2019/0147288 A1* | 5/2019 | Gupta ................... G06K 9/6202 715/253 |
| 2019/0212989 A1* | 7/2019 | Polozov ............... G06N 3/0445 |
| 2019/0213601 A1* | 7/2019 | Hackman ............... G06N 3/084 |
| 2019/0251707 A1* | 8/2019 | Gupta ..................... G06T 9/002 |
| 2019/0295544 A1* | 9/2019 | Garcia ................... G06F 40/30 |
| 2019/0318405 A1* | 10/2019 | Hu .......................... G06F 16/55 |
| 2019/0392231 A1* | 12/2019 | Dean ...................... G06N 20/20 |
| 2020/0005149 A1* | 1/2020 | Ramanath ............. G06F 16/245 |
| 2020/0005153 A1* | 1/2020 | Ramanath ................ G06N 3/04 |
| 2020/0057850 A1* | 2/2020 | Kraus ...................... G06N 3/08 |
| 2020/0134016 A1* | 4/2020 | Cao ....................... G06F 40/253 |
| 2020/0142365 A1* | 5/2020 | Sharma .................. G05B 15/02 |
| 2020/0167642 A1* | 5/2020 | Dhurandhar ........... G06N 20/00 |
| 2020/0184959 A1* | 6/2020 | Yasa ................... G10L 15/1815 |
| 2020/0192983 A1* | 6/2020 | Deng .................... G06F 40/289 |
| 2020/0226401 A1* | 7/2020 | Rajagopal .............. G06N 7/005 |

FOREIGN PATENT DOCUMENTS

| | | |
|---|---|---|
| CN | 107357775 A | 11/2017 |
| CN | 108052658 A | 5/2018 |
| CN | 108108349 A | 6/2018 |
| CN | 108563632 A | 9/2018 |
| CN | 108803890 A | 11/2018 |

OTHER PUBLICATIONS

Search Report dated Mar. 20, 2020 issued in connection with Chinese Application No. 2018115439626.

* cited by examiner

METHOD AND DEVICE FOR CORRECTING ERROR IN TEXT

CROSS-REFERENCE TO RELATED APPLICATION

This application claims priority to Chinese Patent Application No. 201811543962.6, filed on Dec. 17, 2018, which is hereby incorporated by reference in its entirety.

TECHNICAL FIELD

The present application relates to the field of computer technology, and in particular, to a method and device for correcting an error in a text.

BACKGROUND

A tree model is generally used to perform error correction on an input text. A basic error correction model can be obtained by performing data accumulation and data statistics for different scenarios and then using a strong feature combination capacity of the tree model.

According to scenarios, error correction requirements are mainly used in big search, voice error correction, and long text error correction. Advantages of the tree model lies in that a statistical feature can be processed by it and it is effective in a vertical scenario that requires big search error correction and voice error correction based on statistics.

However, the tree model is less efficient in a long text error correction scenario. Moreover, when modifying bad-cases, and leaning and memorizing on real feedback numbers, it is required to re-train a model, which may affect an original error correction capacity of the tree model.

SUMMARY

A method and device for correcting an error in a text are provided according to embodiments of the present application, so as to at least solve the above technical problems in the existing technology.

According to a first aspect, a method for correcting an error in a text includes:

preprocessing the text to obtain at least one segment of the text;

generating a plurality of candidate segments for the segment; scoring the plurality of candidate segments with a tree model, to obtain respective first scoring results of the plurality of candidate segments;

scoring the plurality of candidate segments with a deep neural network model, to obtain respective second scoring results of the plurality of candidate segments;

for each candidate segment, calculating a scoring of the candidate segment based on the first scoring result and the second scoring result of the candidate segment;

ranking the plurality of candidate segments according to the scorings of the candidate segments, to obtain a ranking result; and correcting the error in the text according to the ranking result In an implementation, the generating a plurality of candidate segments for the segment; scoring the plurality of candidate segments with a tree model, to obtain respective first scoring results of the plurality of candidate segments includes:

replacing a word of the segment with a plurality of candidate words of a phase table, to obtain the plurality of candidate segments for the segment; and inputting the plurality of candidate segments for the segment into the tree model, to obtain the respective first scoring results of the plurality of candidate segments.

In an implementation, the correcting the error in the text according to the ranking result includes:

performing a decoding process on the plurality of candidate segments for the segment, wherein the decoding process includes determining a candidate segment with the highest scoring to be a resulting segment for the segment; and forming a resulting correction text for the text according to the resulting segment for the segment.

In an implementation, the method further includes: constructing the deep neural network model by:

forming a user feedback corpus by using a correct replacing text, corrected by a user, of an input error text;

performing context modeling of the deep neural network model based on the user feedback corpus by using an error correction pair vector, to fit and memorize the correct replacing text of the input error text.

In an implementation, the forming a user feedback corpus by using a correct replacing text, corrected by a user, of an input error text includes:

obtaining the input error text;

providing replacing texts to be selected, by an error correction prompting service;

determining a replacing text selected by clicking, as the correct replacing text; and mapping the input error text to the selected replacing text, to form the user feedback corpus.

According to a second aspect, a device for correcting an error in a text includes:

a preprocessing module configured to preprocess the text to obtain at least one segment of the text;

a first scoring module configured to generate a plurality of candidate segments for the segment; and score the plurality of candidate segments with a tree model, to obtain respective first scoring results of the plurality of candidate segments;

a second scoring module configured to score the plurality of candidate segments with a deep neural network model, to obtain respective second scoring results of the plurality of candidate segments;

a calculating module configured to, for each candidate segment, calculate a scoring of the candidate segment based on the first scoring result and the second scoring result of the candidate segment;

a ranking module configured to rank the plurality of candidate segments according to the scorings of the candidate segments, to obtain a ranking result; and a correcting module configured to correcting the error in the text according to the ranking result.

In an implementation, the first scoring module is further configured to:

replace a word of the segment with a plurality of candidate words of a phase table, to obtain the plurality of candidate segments for the segment; and input the plurality of candidate segments for the segment into the tree model, to obtain the respective first scoring results of the plurality of candidate segments.

In an implementation, the correcting module is further configured to:

perform a decoding process on the plurality of candidate segments for the segment, wherein the decoding process includes determining a candidate segment with the highest scoring to be a resulting segment for the segment; and form a resulting correction text for the text according to the resulting segment for the segment.

In an implementation, the device further includes: a constructing module configured to construct the deep neural network model by: forming a user feedback corpus by using a correct replacing text, corrected by a user, of an input error text; performing context modeling of the deep neural network model based on the user feedback corpus by using an error correction pair vector, to fit and memorize the correct replacing text of the input error text.

In an implementation, the constructing module is further configured to:

obtain the input error text;

provide replacing texts to be selected, by an error correction prompting service;

determine a replacing text selected by clicking, as the correct replacing text; and mapping the input error text to the selected replacing text, to form the user feedback corpus.

In a third aspect, a device for correcting an error in a text is provided according to an embodiment of the present application. Functions of the device may be implemented by hardware, and may also be implemented through executing corresponding software by hardware. The hardware or software includes one or more modules corresponding to the above functions.

In a possible design, the device includes a processor and a storage, the storage is configured to store a program for supporting the above method executed by the above device, and the processor is configured to execute the program stored in the storage. The device further includes a communication interface configured for communication with another device or communication network.

In a fourth aspect, a computer-readable storage medium is provided for storing computer software instructions used by the above device, the computer software instructions include programs involved in execution of any one of the above method.

One of the above technical solutions has the following advantages or beneficial effects: a candidate segment is firstly scored with a tree model; the candidate segment is scored with a deep neural network model in combination with context information; a final scoring result is obtained with the tree model and the deep neural network model and is used for ranking and error correction. While a feature combination capacity of the tree model is maintained, context modelling of the deep neural network is incorporated, thus performing error correction in combination with the context and improving an accuracy of an error correction result.

The above summary is for the purpose of the specification only and is not intended to be limiting in any way. In addition to the illustrative aspects, embodiments, and features described above, further aspects, embodiments, and features of the present application will be readily understood by reference to the drawings and the following detailed description.

BRIEF DESCRIPTION OF THE DRAWINGS

In the drawings, unless otherwise specified, identical reference numerals will be used throughout the drawings to refer to identical or similar parts or elements. The drawings are not necessarily drawn to scale. It should be understood that these drawings depict only some embodiments disclosed in accordance with the present application and are not to be considered as limiting the scope of the present application.

DETAILED DESCRIPTION OF EMBODIMENT(S)

In the following, only certain exemplary embodiments are briefly described. As those skilled in the art would realize, the described embodiments may be modified in various different ways, all without departing from the spirit or scope of the present application. Accordingly, the drawings and description are to be regarded as illustrative in nature and not restrictive.

Figure 1:
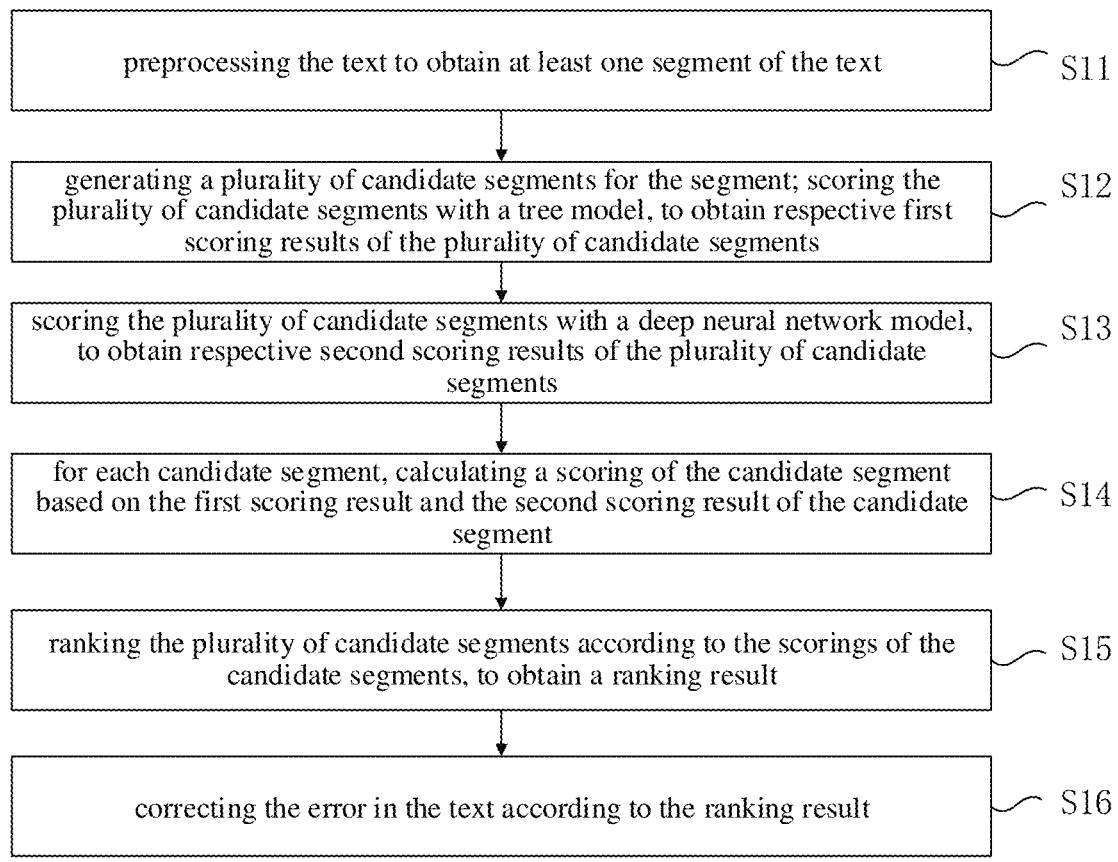
FIG. 1 shows a flowchart of a method for correcting an error in a text according to an embodiment of the present application.

FIG. 1 shows a flowchart of a method for correcting an error in a text according to an embodiment of the present application. As shown in FIG. 1, the method may include steps S11 to S16.

At S11, the text is preprocessed to obtain at least one segment of the text.

In an example, after obtaining a query input by a user into a search engine, an automatic error correction may be triggered. The user may input a long text into the search engine on the internet. If a character, a word or a phrase is determined to have an error according to the context, which may result in poor and unclear expression of the long text, the entire long text may be checked over automatically after the long text being input. If the long text is correct, the error correction is not needed. If there is an error in the long text, the error will be corrected automatically.

In this embodiment, the long text in the input query may include various types. For example, the long text may be one or more sentences, one or more paragraphs, an article and so on. With the technical solution of this embodiment, the long text may be used as the text to be corrected, and an error in a sentence, a paragraph, an article and the like in the long text may be corrected.

In an example, when performing error correction on the long text, it is possible to perform word segmentation, phonetic notation and the like on the long text, to obtain a plurality of words. Here, one or more words may constitute a segment.

S12, a plurality of candidate segments for the segment is generated; the plurality of candidate segments are scored with a tree model, to obtain respective first scoring results of the plurality of candidate segments.

In an implementation, S12 may include: replacing a word of the segment with a plurality of candidate words of a phase table (PT), to obtain the plurality of candidate segments for the segment; and inputting the plurality of candidate segments for the segment into the tree model, to obtain the respective first scoring results of the plurality of candidate segments.

In this embodiment, the phrase table may be preset. By determining the segments obtained by word segmentation as original segments, a word of each of the original segments to be corrected may be replaced with a plurality of candidate words of the PT, to obtain a candidate segment set of each original segment. A candidate segment set may include a plurality of candidate segments.

In an example, the tree model may be constructed based on a fitting result of clicks from users of big search. Here, the users of the big search may include users performing a search using a search engine on the internet. When constructing the tree model, a correct candidate segment may be obtained by fitting options clicked by users, the correct candidate segment may be used in learning to rank (ltr).

At S13, the plurality of candidate segments are scored with a deep neural network model, to obtain respective second scoring results of the plurality of candidate segments.

In certain scenarios, whether a word is expressed correctly is related to the context. Therefore, a word appearing most frequently is not necessarily to be a correct word. When performing the error correction, a statistics result, for example an occurrence frequency, may be used as a scoring result. After performing the error correction, the context may be used for assisting the error correction.

In an example, context modeling of a deep neural network may be performed. In the long text, a current word is connected with previous words and subsequent words. The error correction result is related to both the current word and the previous and subsequent words. Whether to perform error correction on the current word may be determined by analyzing according to the previous words and subsequent words of the current word in combination of the context. For example, the analyzing may be performed according to three previous words and/or three subsequent words of the current word.

At S14, for each candidate segment, a scoring of the candidate segment is calculated based on the first scoring result and a second scoring result of the candidate segment.

Various methods may be used for calculating. For example, the first scoring result and the second scoring result may be summed up and may also be summed up according to respective weights of the two scoring results. Other calculating methods can also be used.

At S15, the plurality of candidate segments are ranked according to the scorings of the candidate segments, to obtain a ranking result.

For example, if a higher score indicates a more accurate segment, the scorings of the candidate segments may be ranked from large to small. For another example, if a lower score indicates a more accurate segment, the scorings of the candidate segments may be ranked from small to large.

At S16, the error in the text is corrected according to the ranking result.

In an example, a decoding process is performed on a plurality of candidate segments for each segment, wherein the decoding process includes determining a candidate segment with the highest scoring to be a resulting segment for the segment. Then, the resulting segments are used to replace error segments in the long text respectively according to an original sequence and positions of the error segments, so as to form a new long text. If no segment is replaced in the long text, it indicates that there is no error in the long text.

Figure 2:
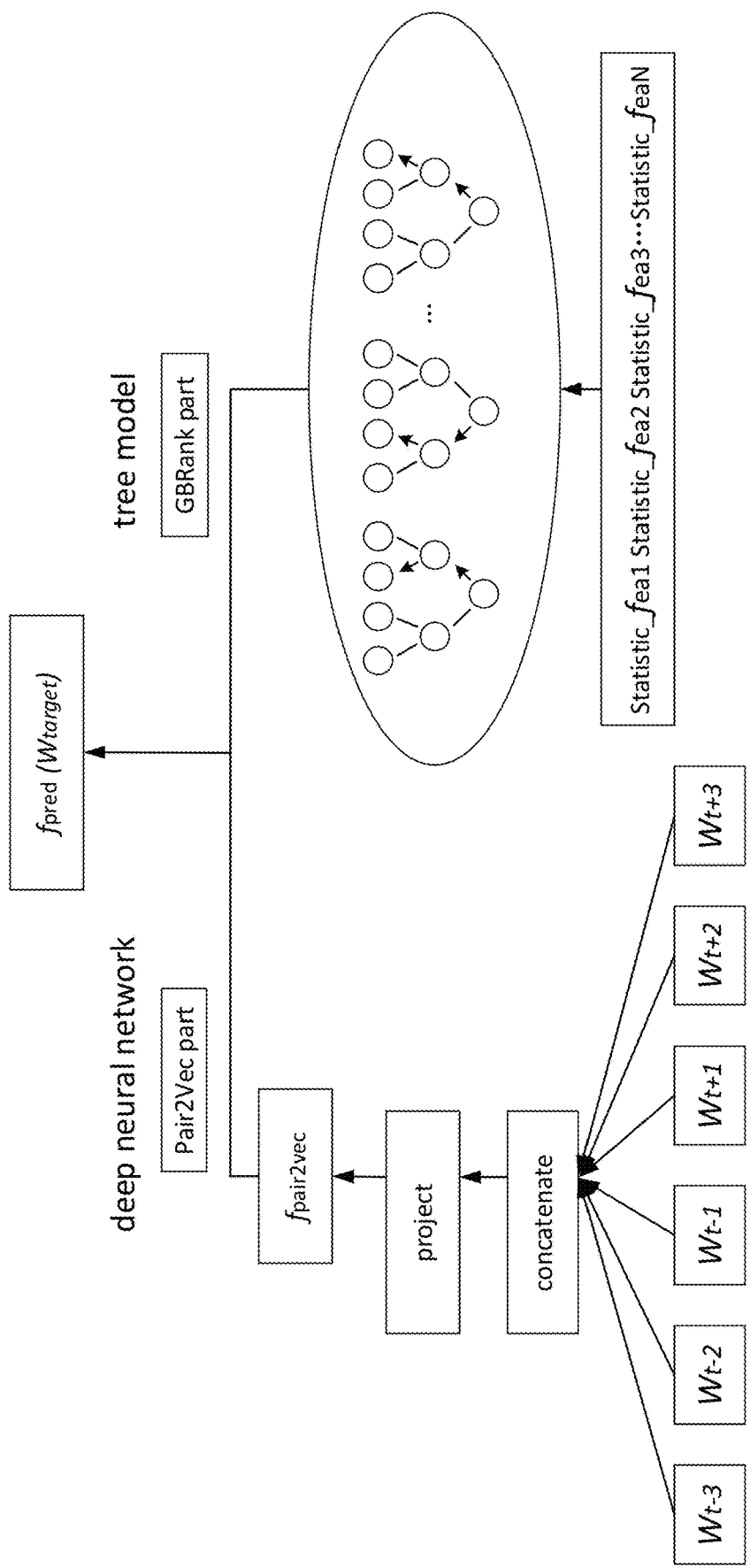
FIG. 2 shows a schematic diagram of an example of a method for correcting an error in a text according to another embodiment of the present application.

In an application example, as shown in FIG. 2, an error correction structure of the tree model is shown at the right side. For example, a gradient boosting decision tree (GBDT) may be used. A scoring result of GBDT may be obtained by statistics features, and therefore, the following equation may be used to represent the scoring result of the tree model $$S_{gbdt} = f_{GBRank}(X_{statistic}) \quad (1)$$

where $X_{statistic}$ represents a statistic feature, $S_{gbdt}$ represents a score obtained by using the tree model according to the statistic feature.

FIG. 2 shows a deep neural network model at the left side. The deep neural network model may be represented by the following equation (2):

$$f_{Pair2Vec} = \mathrm{sigmoid}(\cos(\theta_{context}, \theta_{origin\text{-}target})) \quad (2)$$

wherein $\theta_{context}$ represents a context embedding vector, $\theta_{origin\text{-}target}$ represents an embedding vector of replacing an original segment with a candidate segment, $f_{pair2vec}$ represents a score obtained by using the deep neural network, and sigmoid ( ) represents an activating function.

Calculating a score of a candidate segment based on one scoring result obtained by using the tree model and the other scoring result obtained by using the deep neural network model may be represented by the following equation (3):

$$f_{pred}(W_{target}) = \mathrm{sigmoid}(S_{gbdt} + S_{deep}) \quad (3)$$

where $f_{pred}(W_{target})$ represents a score of a candidate segment $W_{taret}$ calculated based on one scoring result obtained by using the tree model and the other scoring result obtained by using the deep neural network model, where $S_{deep} = f_{pair2vec}$.

The tree model is strong in feature combination. A series of segments are obtained by performing word segmentation on a long text in a query. Each segment has a plurality of candidate segments. According to a statistic feature, a plurality of candidate segments of each segment is scored with the tree model, and the plurality of candidate segments is scored and ranked based on a statistic result. The tree model is constructed based on a statistic feature. For example, if there are N statistic features, such as Statistic_fea1, Statistic_fea2, Statistic_fea3 . . . Statistic_feaN in FIG. 2, a distinguishable feature may be selected as a prominent feature and used as a splitting node of the tree model. If a feature exceeds a preset value, it is positioned at the left side of the splitting node. If a feature is lower than the preset value, it is positioned at the right side of the splitting node.

In this embodiment, a principle of performing error correction with the tree model mainly lies in ranking the segments based on a statistics result For example, if for one segment, there are a plurality of candidate segments, such as $a_1, a_2 \ldots a_n$, then the plurality of candidate segments are scored to obtain respective first scoring results of the plurality of candidate segments and then the first scoring results are ranked.

As shown in FIG. 2, in the deep neural model, $W_t$ represents the current word, $W_{t+1}, W_{t+2}, W_{t+3}$ represent three words after $W_t$, and $W_{t-1}, W_{t-2}, W_{t-3}$ represent three words before $W_t$, where these words represent context words other than the current word in the context. Vectors of the context words are concatenated and then an inner product of the vectors of the context words with the vector of a candidate segment is calculated. Further, a score $f_{pair2vec}$ is obtained by using the deep neural network model according to a sigmoid activating function.

As shown in FIG. 2, taking the vectors of the above six context words as an example, if a word vector of each context word is represented by a 50-dimension vector, then the "concatenate" in FIG. 2 represents that a 300-dimension vector (50*6) is obtained by concatenating the vectors of the six context words. The "project" in FIG. 2 represents the concatenated 300-dimension vector is projected to be a 50-dimension vector by a full connected layer.

The tree model part is a GBRank part, and an online learning part of the deep neural network part is a Pair2vec part. Based on a scoring result obtained by using the tree model in combination with a result obtained by using the online learning part, a final scoring result of the error correction may be obtained. In an example, the tree model may not be updated, so as to maintain a basic error correction capacity. Based on the above, context modeling of the deep neural network model may be performed by using a user feedback corpus, so as to perform learning and memorizing with corpus. Therefore, it is possible to cover the shortage of the tree model.

Figure 3:
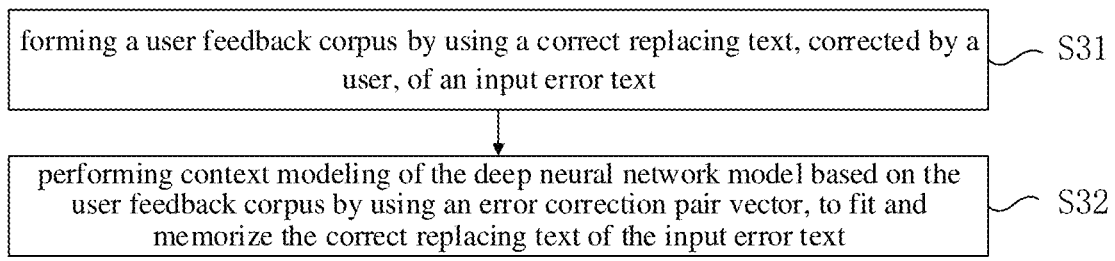
FIG. 3 shows a flowchart of a method for correcting an error in a text according to an embodiment of the present application.

In an implementation, as shown in FIG. 3, a process for constructing the deep neural network model includes:

S31, forming a user feedback corpus by using a correct replacing text, corrected by a user, of an input error text; and S32, performing context modeling of the deep neural network model based on the user feedback corpus by using an error correction pair vector (LightPair2vec), to fit and memorize the correct replacing text of the input error text.

During a search process, if the query input by the user includes the text with an error, the user may perform error correction actively, and may also perform selection from options provided by an error correction prompting service (se_query) of a search engine. If the user amends the text with an error to a correct replacing text or selects the correct replacing text by clicking, the text with an error and the correct replacing text may be used as the user feedback corpus. Using the error correction pair vector (Light Pair2vec), context modelling of the deep neural network model may be performed in combination with the user feedback corpuses of a plurality of users, thus performing online learning and memorizing on the user feedback corpus and performing fitting and memorizing on the correct replacing text for the text with an error.

Figure 4:
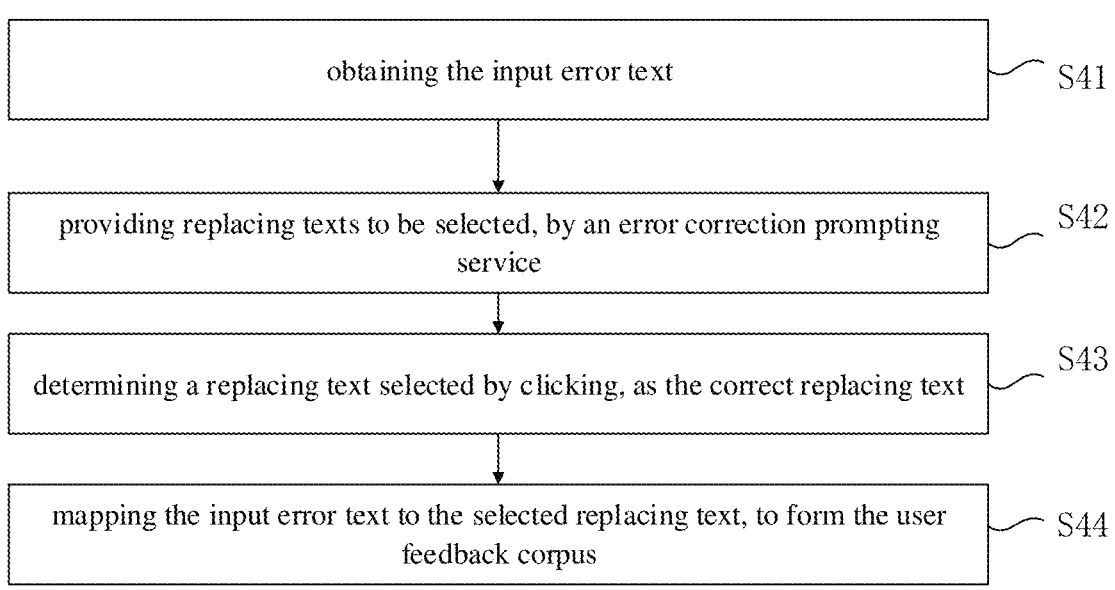
FIG. 4 shows a flowchart of a method for correcting an error in a text according to an embodiment of the present application.

In an implementation, as shown in FIG. 4, the forming a user feedback corpus by using a correct replacing text, corrected by a user, of an input error text includes:

S41, obtaining the input error text;

S42, providing replacing texts to be selected, by an error correction prompting service;

S43, determining a replacing text selected by clicking, as the correct replacing text; and S44, mapping the input error text to the selected replacing text, to form the user feedback corpus.

For example, the user wants to input a query including "name" into the search engine, but inputs "lame" by mistake. In this case, the error may be detected by the error correction prompting service of the search engine, and a plurality of options including "name", "lame", "same" and the like may be displayed. If the user selects the option "name" by clicking, and at this time, "lame" may be mapped to the option "name" clicked by the user, and "lame" and the corresponding correct replacing text "name" can be used as the user feedback corpus.

In addition, the user feedback corpus may also be generated according to a modifying operation actively performed by the user.

For example, the user wants to input a query including "used name", but input "used lame" by mistake. The user found this mistake and modified it by amending "lame" to "name" In this case, "used lame" and the corresponding correct replacing text "used name" may be used as the user feedback corpus.

In context modelling of the deep neural network model, when performing error correction on a text, context information of the text to be corrected may be used. Hence, an text error correction method by combining the tree model and the deep neural network model is provided according to the embodiments of the present application. With the method, while maintaining a strong feature combination capacity of the tree model, a context modelling of the deep neural network model is incorporated, to obtain a model with a better learning and memorizing capacity. Online learning may be achieved by the deep neural network. For example, feedback from users in applications such as Baijia, Rich media, Feed, advertisement and the like may be learned and memorized, so as to achieve to accumulate and customize scenario-related data. Scoring by the tree model may be affected by the deep neural network model, to obtain a final scoring result, thus improving the accuracy of error correction. Then it is possible to better meet requirements of users and improve user experience.

Figure 5:
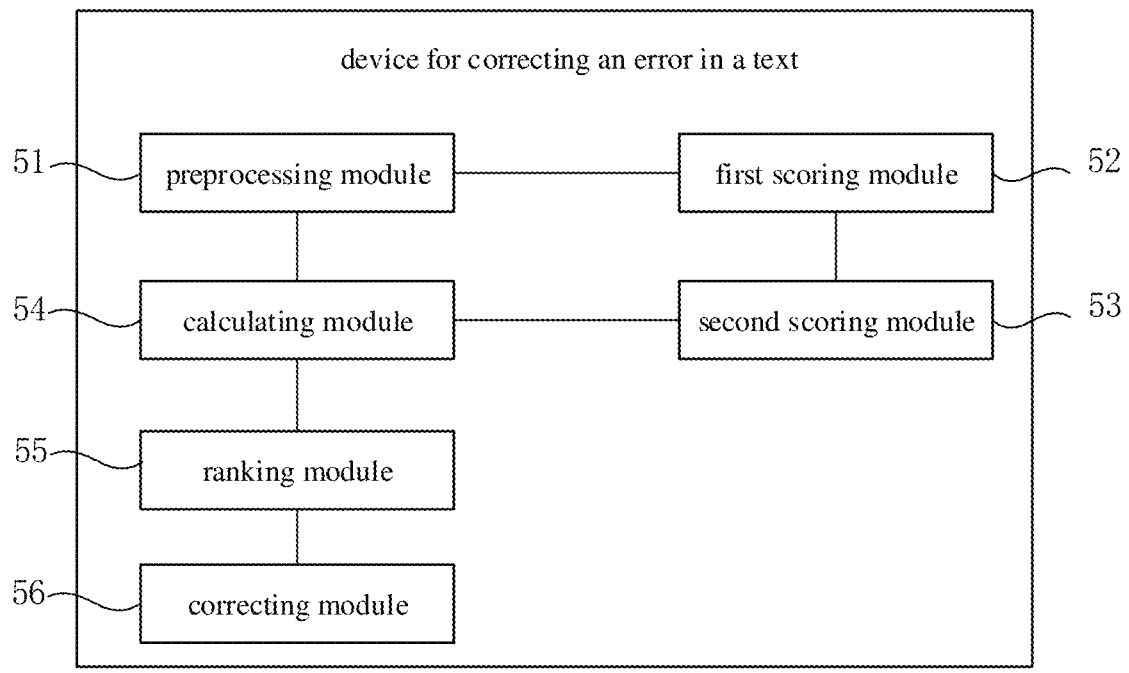
FIG. 5 shows a structural block diagram of a device for correcting an error in a text according to an embodiment of the present application.

FIG. 5 shows a structural block diagram of a device for correcting an error in a text according to an embodiment of the present application. As shown in FIG. 5, the device may include:

a preprocessing module 51 configured to preprocess the text to obtain at least one segment of the text;

a first scoring module 52 configured to generate a plurality of candidate segments for the segment; and score the plurality of candidate segments with a tree model, to obtain respective first scoring results of the plurality of candidate segments;

a second scoring module 53 configured to score the plurality of candidate segments with a deep neural network model, to obtain respective second scoring results of the plurality of candidate segments;

a calculating module 54 configured to, for each candidate segment, calculate a scoring of the candidate segment based on the first scoring result and the second scoring result of the candidate segment;

a ranking module 55 configured to rank the plurality of candidate segments according to the scorings of the candidate segments, to obtain a ranking result; and a correcting module 56 configured to correcting the error in the text according to the ranking result.

In an implementation, the first scoring module is further configured to:

replace a word of the segment with a plurality of candidate words of a phase table, to obtain the plurality of candidate segments for the segment; and input the plurality of candidate segments for the segment into the tree model, to obtain the respective first scoring results of the plurality of candidate segments.

In an implementation, the correcting module is further configured to:

perform a decoding process on the plurality of candidate segments for the segment, wherein the decoding process includes determining a candidate segment with the highest scoring to be a resulting segment for the segment; and form a resulting correction text for the text according to the resulting segment for the segment.

Figure 6:
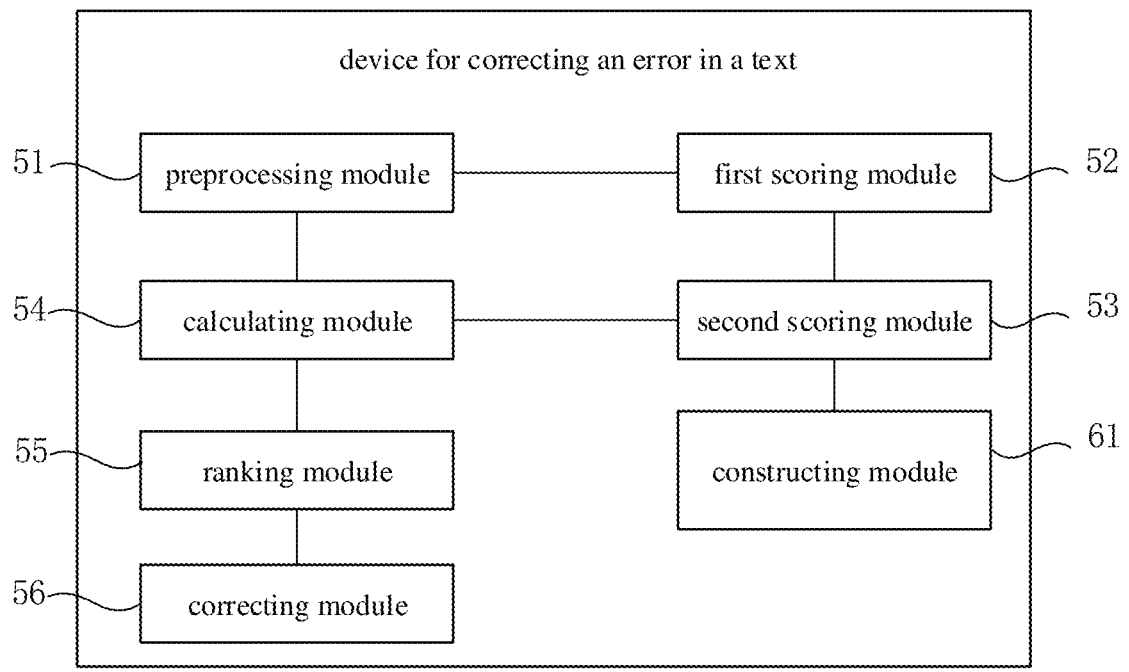
FIG. 6 shows a structural block diagram of a device for correcting an error in a text according to an embodiment of the present application.

In an implementation, as shown in FIG. 6, the device may further include: a constructing module 61 configured to construct the deep neural network model by: forming user feedback corpus by using a correct replacing text, corrected by a user, of an input error text; performing context modeling of the deep neural network model based on the user feedback corpus by using an error correction pair vector, to fitting and memorize the correct replacing text of the input error text.

In an implementation, the constructing module is further configured to:

obtaining the input error text;

provide replacing texts to be selected, by an error correction prompting service;

determine the selected text as the correct replacing text; and mapping the input error text to the selected replacing text, to form the user feedback corpus.

In the embodiments of the present application, functions of modules in the device refer to the corresponding description of the above mentioned method and thus the description thereof is omitted herein.

Figure 7:
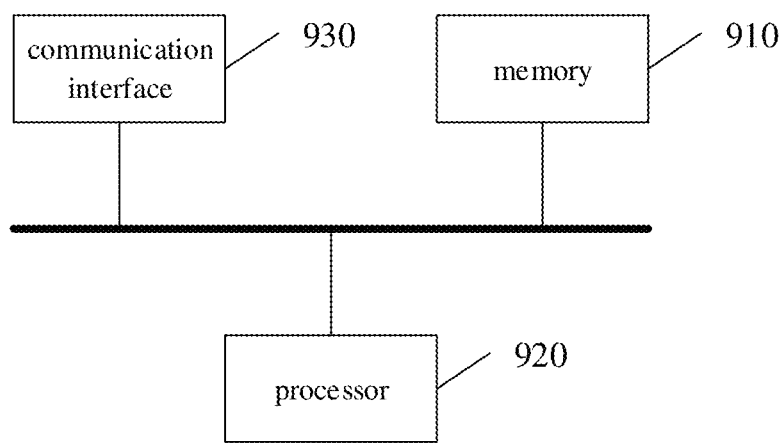
FIG. 7 shows a structural block diagram of a device for correcting an error in a text according to an embodiment of the present application.

FIG. 7 shows a structural block diagram of a device for correcting an error in a text according to an embodiment of the present application. As shown in FIG. 7, the device includes a memory 910 and a processor 920. The memory 910 stores a computer program executable on the processor 920. When the processor 910 executes the computer program, the method in the foregoing embodiment is implemented. The number of the memory 910 and the processor 920 may be one or more.

The device further includes:

a communication interface 930 configured to communicate with an external device and exchange data.

The memory 910 may include a high-speed RAM memory and may also include a non-volatile memory, such as at least one magnetic disk memory.

If the memory 910, the processor 920, and the communication interface 930 are implemented independently, the memory 910, the processor 920, and the communication interface 930 may be connected to each other through a bus and communicate with one another. The bus may be an Industry Standard Architecture (ISA) bus, a Peripheral Component (PCI) bus, an Extended Industry Standard Component (EISA) bus, or the like. The bus may be divided into an address bus, a data bus, a control bus, and the like. For ease of illustration, only one bold line is shown in FIG. 7, but it does not mean that there is only one bus or one type of bus.

Optionally, in a specific implementation, if the memory 910, the processor 920, and the communication interface 930 are integrated on one chip, the memory 910, the processor 920, and the communication interface 930 may implement mutual communication through an internal interface.

According to an embodiment of the present application, a computer-readable storage medium is provided for storing computer software instructions, which include programs involved in execution of the above method.

In the description of the specification, the description of the terms "one embodiment," "some embodiments," "an example," "a specific example," or "some examples" and the like means the specific features, structures, materials, or characteristics described in connection with the embodiment or example are included in at least one embodiment or example of the present application. Furthermore, the specific features, structures, materials, or characteristics described may be combined in any suitable manner in any one or more of the embodiments or examples. In addition, different embodiments or examples described in this specification and features of different embodiments or examples may be incorporated and combined by those skilled in the art without mutual contradiction.

In addition, the terms "first" and "second" are used for descriptive purposes only and are not to be construed as indicating or implying relative importance or implicitly indicating the number of indicated technical features. Thus, features defining "first" and "second" may explicitly or implicitly include at least one of the features. In the description of the present application, "a plurality of" means two or more, unless expressly limited otherwise.

Any process or method descriptions described in flowcharts or otherwise herein may be understood as representing modules, segments or portions of code that include one or more executable instructions for implementing the steps of a particular logic function or process. The scope of the preferred embodiments of the present application includes additional implementations where the functions may not be performed in the order shown or discussed, including according to the functions involved, in substantially simultaneous or in reverse order, which should be understood by those skilled in the art to which the embodiment of the present application belongs.

Logic and/or steps, which are represented in the flowcharts or otherwise described herein, for example, may be thought of as a sequencing listing of executable instructions for implementing logic functions, which may be embodied in any computer-readable medium, for use by or in connection with an instruction execution system, device, or apparatus (such as a computer-based system, a processor-included system, or other system that fetch instructions from an instruction execution system, device, or apparatus and execute the instructions). For the purposes of this specification, a "computer-readable medium" may be any device that may contain, store, communicate, propagate, or transport the program for use by or in connection with the instruction execution system, device, or apparatus. More specific examples (not a non-exhaustive list) of the computer-readable media include the following: electrical connections (electronic devices) having one or more wires, a portable computer disk cartridge (magnetic device), random access memory (RAM), read only memory (ROM), erasable programmable read only memory (EPROM or flash memory), optical fiber devices, and portable read only memory (CDROM). In addition, the computer-readable medium may even be paper or other suitable medium upon which the program may be printed, as it may be read, for example, by optical scanning of the paper or other medium, followed by editing, interpretation or, where appropriate, process otherwise to electronically obtain the program, which is then stored in a computer memory.

It should be understood that various portions of the present application may be implemented by hardware, software, firmware, or a combination thereof. In the above embodiments, multiple steps or methods may be implemented in software or firmware stored in memory and executed by a suitable instruction execution system. For example, if implemented in hardware, as in another embodiment, they may be implemented using any one or a combination of the following techniques well known in the art: discrete logic circuits having a logic gate circuit for implementing logic functions on data signals, application specific integrated circuits with suitable combinational logic gate circuits, programmable gate arrays (PGA), field programmable gate arrays (FPGAs), and the like.

Those skilled in the art may understand that all or some of the steps carried in the methods in the foregoing embodiments may be implemented by a program instructing relevant hardware. The program may be stored in a computer-readable storage medium, and when executed, one of the steps of the method embodiment or a combination thereof is included.

In addition, each of the functional units in the embodiments of the present application may be integrated in one processing module, or each of the units may exist alone physically, or two or more units may be integrated in one module. The above-mentioned integrated module may be implemented in the form of hardware or in the form of software functional module. When the integrated module is implemented in the form of a software functional module and is sold or used as an independent product, the integrated module may also be stored in a computer-readable storage medium. The storage medium may be a read only memory, a magnetic disk, an optical disk, or the like.

The foregoing descriptions are merely specific embodiments of the present application, but not intended to limit the protection scope of the present application. Those skilled in the art may easily conceive of various changes or modifications within the technical scope disclosed herein, all these should be covered within the protection scope of the present application. Therefore, the protection scope of the present application should be subject to the protection scope of the claims.

What is claimed is:

1. A method for correcting an error in a text, comprising:
   preprocessing the text to obtain at least one segment of the text;
   generating a plurality of candidate segments for the segment; scoring the plurality of candidate segments with a tree model, to obtain respective first scoring results of the plurality of candidate segments;
   scoring the plurality of candidate segments with a deep neural network model, to obtain respective second scoring results of the plurality of candidate segments;
   for each candidate segment, calculating a scoring of the candidate segment based on the first scoring result and the second scoring result of the candidate segment;
   ranking the plurality of candidate segments according to the scorings of the candidate segments, to obtain a ranking result; and
   correcting the error in the text according to the ranking result.

2. The method of claim 1, wherein the generating a plurality of candidate segments for the segment; scoring the plurality of candidate segments with a tree model, to obtain respective first scoring results of the plurality of candidate segments comprises:
   replacing a word of the segment with a plurality of candidate words of a phase table, to obtain the plurality of candidate segments for the segment; and
   inputting the plurality of candidate segments for the segment into the tree model, to obtain the respective first scoring results of the plurality of candidate segments.

3. The method of claim 1, wherein the correcting the error in the text according to the ranking result comprises:
   performing a decoding process on the plurality of candidate segments for the segment, wherein the decoding process comprises determining a candidate segment with the highest scoring to be a resulting segment for the segment; and
   forming a resulting correction text for the text according to the resulting segment for the segment.

4. The method of claim 1, further comprising: constructing the deep neural network model by:
   forming a user feedback corpus by using a correct replacing text, corrected by a user, of an input error text;
   performing context modeling of the deep neural network model based on the user feedback corpus by using an error correction pair vector, to fit and memorize the correct replacing text of the input error text.

5. The method of claim 4, wherein the forming a user feedback corpus by using a correct replacing text, corrected by a user, of an input error text comprises:
   obtaining the input error text;
   providing replacing texts to be selected, by an error correction prompting service;
   determining a replacing text selected by clicking, as the correct replacing text; and
   mapping the input error text to the selected replacing text, to form the user feedback corpus.

6. A non-transitory computer-readable storage medium, in which a computer program is stored, wherein the computer program, when executed by a processor, causes the processor to implement the method of claim 1.

7. A device for correcting an error in a text, comprising:
   one or more processors; and
   a storage device configured to store one or more programs, that, when executed by the one or more processors, cause the one or more processors to:
   preprocess the text to obtain at least one segment of the text;
   generate a plurality of candidate segments for the segment; score the plurality of candidate segments with a tree model, to obtain respective first scoring results of the plurality of candidate segments;
   score the plurality of candidate segments with a deep neural network model, to obtain respective second scoring results of the plurality of candidate segments;
   for each candidate segment, calculate a scoring of the candidate segment based on the first scoring result and the second scoring result of the candidate segment;
   rank the plurality of candidate segments according to the scorings of the candidate segments, to obtain a ranking result; and
   correct the error in the text according to the ranking result.

8. The device of claim 7, wherein the one or more programs, when executed by the one or more processors, cause the one or more processors further to:
   replace a word of the segment with a plurality of candidate words of a phase table, to obtain the plurality of candidate segments for the segment; and
   input the plurality of candidate segments for the segment into the tree model, to obtain the respective first scoring results of the plurality of candidate segments.

9. The device of claim 7, wherein the one or more programs, when executed by the one or more processors, cause the one or more processors further to:
   perform a decoding process on the plurality of candidate segments for the segment, wherein the decoding process comprises determining a candidate segment with the highest scoring to be a resulting segment for the segment; and form a resulting correction text for the text according to the resulting segment for the segment.

10. The device of claim 7, wherein the one or more programs, when executed by the one or more processors, cause the one or more processors further to:

construct the deep neural network model by:

forming a user feedback corpus by using a correct replacing text, corrected by a user, of an input error text;

performing context modeling of the deep neural network model based on the user feedback corpus by using an error correction pair vector, to fit and memorize the correct replacing text of the input error text.

11. The device of claim 10, wherein the one or more programs, when executed by the one or more processors, cause the one or more processors further to:

obtain the input error text;

provide replacing texts to be selected, by an error correction prompting service;

determine a replacing text selected by clicking, as the correct replacing text; and mapping the input error text to the selected replacing text, to form the user feedback corpus.

* * * * *